March 13, 1956 — F. BURNETT — 2,738,202
AUTOMOBILE SAFETY STEERING GEAR
Filed May 14, 1953
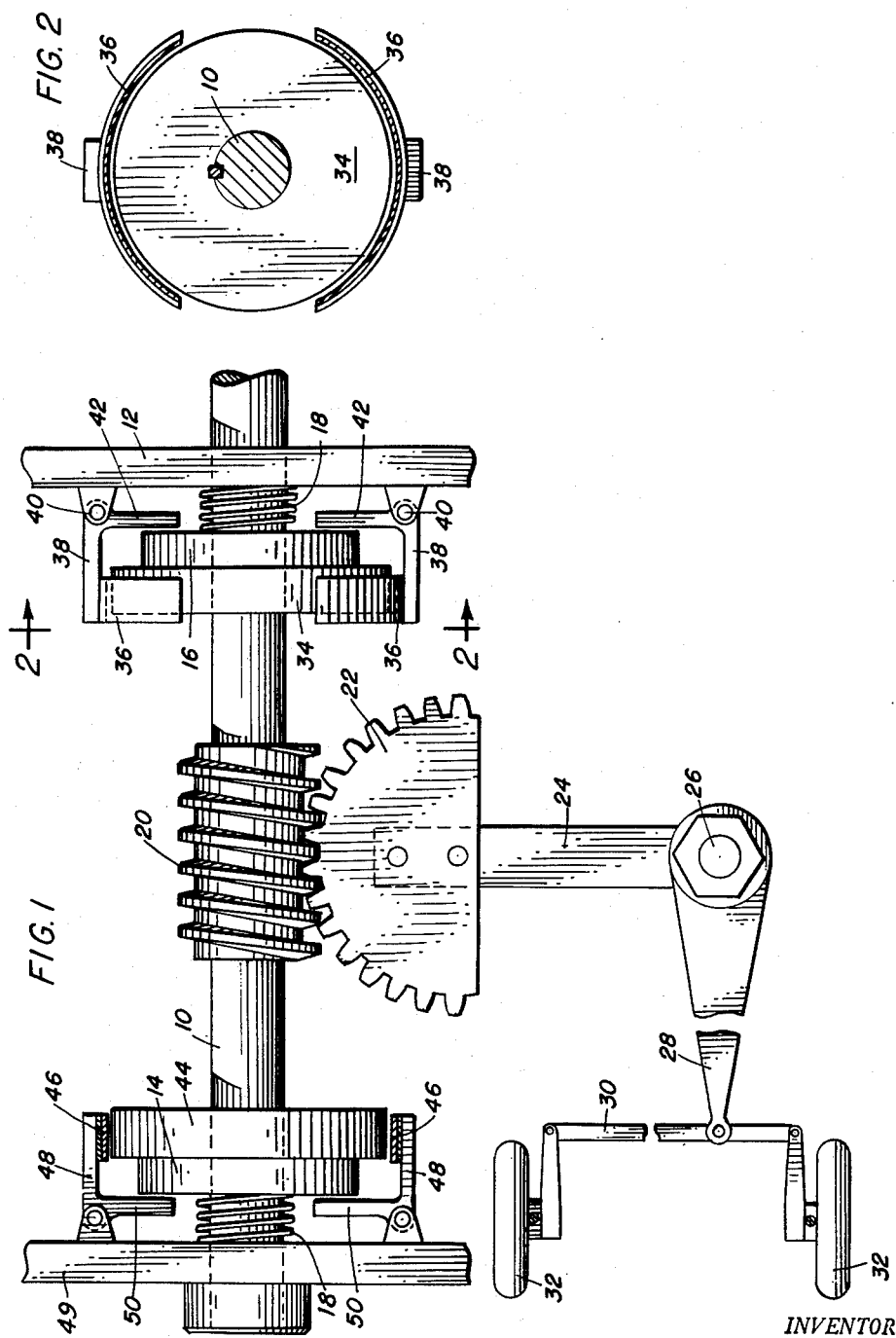
INVENTOR:
FRED BURNETT
BY
ATT'YS

United States Patent Office 2,738,202
Patented Mar. 13, 1956

2,738,202

AUTOMOBILE SAFETY STEERING GEAR

Fred Burnett, Waukegan, Ill.

Application May 14, 1953, Serial No. 355,199

4 Claims. (Cl. 280—89)

(Granted under Title 35, U. S. Code (1952), sec. 266)

This invention relates to safety steering gear for automobiles and is more particularly described as a stabilizing device for steering mechanisms, such as pleasure vehicles, trucks, busses, and the like.

In the ordinary steering mechanism a sudden change, a shock communicated to the steering wheels, such as hitting a curve, a depression, or a large rock or other projection, or when a front tire blows out, an unusual thrust is applied to the steering mechanism which may have a tendency to throw the steering wheel in the driver's hands or to turn the front wheels to one side or other and automatically locks the steering gear and front wheels in an abnormal condition.

The principal object of the present invention is to provide a steering mechanism in which any outside force tending to turn the front wheels against the steering mechanism will cause movement of the thrust plate against a thrust spring and apply a brake to stop the steering shaft from turning.

A further object of the invention is to provide a mechanism in which sudden shocks or strains imparted to the front wheels of a motor vehicle will not affect the steering wheel to the extent that it will be thrown or moved out of the driver's hands, and that such a shock to the driver will be avoided with corresponding avoidance of any resultant accident due to steering.

A still further object of the invention is to provide a safety steering gear which is automatic in its operation so that in the event of a blowout or any shock tending to turn the front wheels, they will be held in their initial position until the driver has had a chance to recover from a sudden unexpected change due to a shock.

Other objects of the invention will appear in the specification and will be apparent from the accompanying drawings, in which:

Fig. 1 is a plan view of an automobile steering gear in accordance with this invention, some of the parts, such as the steering wheel and front mountings, being omitted as unnecessary.

Fig. 2 is a sectional view of the brake drum as taken on the line 2—2 of Fig. 1.

In the ordinary automobile steering gear installations, the steering shaft is connected with the steering wheels by a worm-and-gear connection which does not ordinarily transmit a shock or movement received by the front steering wheels to the steering wheel within the vehicle itself. In high speed operation or when unusual shock is received by the steering wheels, such a sudden shock may be given to the steering gear that it would be detrimental to the operation of the steering wheel and may temporarily take control from the driver. It is this condition which the present safety gear is designed to remedy and overcome.

Referring now more particularly to the drawings, a steering shaft 10 for an automobile is shown in Fig. 1 as extending through a fixed housing 12 near the upper end of the shaft where the steering wheel (not shown) is located and the lower end of the steering shaft is connected to a thrust plate 14.

Adjacent the housing 12 is a thrust plate 16 firmly attached to the shaft and separated from the housing so that a thrust spring 18 surrounding the shaft may be inserted therebetween in a partially compressed condition tending to hold the steering shaft downwardly from the housing.

Attached to or formed integral with the shaft 10 is a driving worm gear 20 the threads of which are adapted to mesh with a toothed steering segment 22 which is connected at one end of an arm 24, the other end of the arm being rotatable on a fixed pivot 26 which is suitably secured to the frame of the automobile or other vehicle. Extending from this pivot is a link 28 pivoted across a bar 30 connected at its ends in any normal manner to vehicle steering wheels 32.

Adjacent the thrust plate 16 and rigidly or otherwise secured to the shaft 10 is a brake drum 34 located on the side opposite the thrust spring 18. The brake drum is provided with a number of brake shoes 36, each of which extends over a portion of the periphery of the drum and each shoe is connected to an angular hanger 38 mounted upon a fixed pivot 40. The brake shoe is connected to one arm of the hanger and another arm 42 extends adjacent the side face of the thrust plate 16 on the side opposite the brake drum but spaced slightly from the thrust plate so that the arms 42 are not ordinarly engaged by the thrust plate when the steering shaft is turned for ordinary operation.

The distance or spacing of the arms 42 is such, however, that whenever an undue shock, jar, or jolt is imparted to the steering wheels and communicated to the steering segment or when the steering shaft is subject to a shock in the frame, the shaft 10 will move the thrust plate 14 against the arms 42 thereby pressing the brake shoes against the brake drum 34 thereby tending to stop the movement of the shaft and to lock it and the steering gear against any further movement of the wheels 32. A quick application of the brake shoes 36 in this manner may prevent a vehicle from being thrown off the road or into the path of another vehicle and materially assist the driver in maintaining and in bringing the vehicle under complete steering control.

If desired, another brake drum 44 may be mounted adjacent the lower thrust plate 14, and this may also be provided with brake shoes 46 mounted on angular hangers 48 pivoted on a lower fixed support 49, the hangers having arms 50 at right angles to the brake shoes in the path of the thrust plate 14. A lower thrust spring 18 around the shaft 10 between the support 49 and the lower thrust plate 14 opposes their movement together and the consequent application of the brake shoes 46. In a violent shock to the steering gear, the shaft 10 may be oscillated in either direction and the addition of the lower brake drum and its spring 18 is an additional security against such shock or strain.

When the vehicle has returned to normal control so that the steering gear is no longer under stress or strain, the brake shoes are automatically released by their contact arms 42 and by the action of the thrust spring 18 in moving the steering wheel and with it the brake drum and thrust plate 16 to its ordinary position and location. Thus, the action of this safety gear is entirely automatic.

While a preferred embodiment has been described in some detail, it should be regarded as an example or embodiment of the invention and not as a restriction or limitation therein as many changes may be made in the construction and arrangement of the parts without departing from the spirit and scope of the invention.

The invention described herein may be manufactured and used by or for the Government of the United States of America for governmental purposes without payment of any royalties thereon and therefor.

I claim:

1. A safety steering gear for automobiles having steerable wheels comprising a steering shaft mounted for limited longitudinal movement having a gear and segment driving connection with the steering wheels of an automobile in combination with a thrust plate fixed to the shaft, a brake drum also fixed to the shaft adjacent the thrust plate and brake shoes pivotally mounted upon brackets to engage the brake drum, the brackets having operating arms disposed adjacent the thrust plate whereby longitudinal movement of the steering shaft and the thrust plate will engage the arms and cause the brake shoes to be applied to the brake drum.

2. In a safety steering gear for automobiles, the combination as set forth in claim 1 in which the steering shaft extends through a fixed housing adjacent the thrust plate and a partially expanded spiral spring surrounds the shaft between the housing and the thrust plate to return the thrust plate and the shaft to normal position.

3. An automobile safety steering gear in accordance with claim 1 in which the brake shoes are disposed about the periphery of the brake drum, each brake shoe being mounted upon an angular bracket attached thereto, the bracket having a pivot fixed in the vehicle and an arm extending at the side of the thrust plate but spaced therefrom so that when the shaft and the thrust plate are moved longitudinally of their axis, the arms of the brackets will be engaged applying the brake shoes to the periphery of the brake drum to stabilize the movement of the steering shaft and its connected steering gear.

4. An automatic safety steering gear for vehicles comprising a steering shaft mounted for limited longitudinal movement, a gear and segment connecting the shaft to the steering wheels of a vehicle, a pair of thrust plates on said shaft on opposite sides of said gear and segment, a brake drum secured to the shaft adjacent each thrust plate, a plurality of brake shoes for each brake drum, means mounting the brake shoes adjacent the periphery of the brake drums, said means also including an operating arm arranged adjacent the side of the thrust plate opposite the brake drum whereby the movement of the shaft in either direction will cause the application of one or the other sets of brake shoes to the corresponding brake drum and spring means for each thrust plate surrounding the steering shaft and engaging each thrust plate tending to maintain the shaft in its central position.

References Cited in the file of this patent

UNITED STATES PATENTS

| | | |
|---|---|---|
| 905,912 | Nehring | Dec. 8, 1908 |
| 1,983,459 | Hockman | Dec. 4, 1934 |
| 2,075,567 | Benedek | Mar. 30, 1937 |
| 2,085,718 | Love | June 29, 1937 |